US012093514B1

(12) United States Patent
Baskaran et al.

(10) Patent No.: US 12,093,514 B1
(45) Date of Patent: Sep. 17, 2024

(54) SYSTEMS AND METHODS OF DETERMINING CONTRAST FOR ACCESSIBILITY

(71) Applicant: JPMORGAN CHASE BANK, N.A., New York, NY (US)

(72) Inventors: Sri Baskaran, New York, NY (US); Venkata Sudheer Babu Chundi, Plano, TX (US); Chakrapani Chittabathina, Plano, TX (US); Rasanjaya Herath Mudiyanselage, Irving, TX (US); Mizan Miah, Wilmington, DE (US); Muralidhar Somipalli, Tampa, FL (US); Manikanth Sakuru, Irving, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/457,231

(22) Filed: Dec. 1, 2021

(51) Int. Cl.
*G06F 3/04842* (2022.01)
*G06F 3/04812* (2022.01)
*G06F 3/04845* (2022.01)

(52) U.S. Cl.
CPC ...... *G06F 3/04842* (2013.01); *G06F 3/04812* (2013.01); *G06F 3/04845* (2013.01)

(58) Field of Classification Search
CPC ............. G06F 3/04842; G06F 3/04812; G06F 3/04845
See application file for complete search history.

(56) References Cited

U.S. PATENT DOCUMENTS

| 8,406,528 B1 | 3/2013 | Hatwich | |
| 10,319,116 B1* | 6/2019 | C | G09G 5/377 |
| 10,643,353 B2* | 5/2020 | Baldwin | G06T 11/001 |
| 11,107,258 B2* | 8/2021 | Loughry | H04N 21/42202 |
| 2003/0164810 A1* | 9/2003 | Kim | G09G 3/2003 |
| | | | 348/E5.073 |

(Continued)

OTHER PUBLICATIONS

International Search Report, dated Jul. 27, 2022, from corresponding International Application No. PCT/US2021/072702.

(Continued)

*Primary Examiner* — Adam M Queler
*Assistant Examiner* — David Faber
(74) *Attorney, Agent, or Firm* — GREENBERG TRAURIG LLP (57) ABSTRACT

Systems, methods, and devices for determining a contrast of colors displayed by a digital user interface are disclosed, In one embodiment, in an electronic device including a processor, a compliance module is configured to receive a user selection of a graphical element displayed on a user interface of the electronic device; determine first color data associated with a background of the selected graphical element; determine second color data associated with a text string within the selected graphical element; determine a luminosity associated with the first color data and a luminosity associated with the second color data; calculate a color contrast ratio based on the luminosity associated with the first color data and the luminosity associated with the second color data; and display, at the user interface of the electronic device, the calculated color contrast ratio.

20 Claims, 3 Drawing Sheets

(56) References Cited

U.S. PATENT DOCUMENTS

| | | | | |
|---|---|---|---|---|
| 2006/0257023 | A1* | 11/2006 | Obrador | H04N 1/62 |
| | | | | 382/173 |
| 2006/0274162 | A1* | 12/2006 | Fujishiro | G09G 3/3607 |
| | | | | 348/E9.042 |
| 2009/0106011 | A1* | 4/2009 | Chen | G06F 8/10 |
| | | | | 703/17 |
| 2009/0263016 | A1 | 10/2009 | Kuo | |
| 2010/0174930 | A1* | 7/2010 | Kim | G06F 1/3265 |
| | | | | 713/320 |
| 2011/0074807 | A1* | 3/2011 | Inada | G06T 11/001 |
| | | | | 345/589 |
| 2013/0339907 | A1* | 12/2013 | Matas | G06F 3/04845 |
| | | | | 715/853 |
| 2015/0106755 | A1* | 4/2015 | Moore | G06F 40/106 |
| | | | | 715/765 |
| 2016/0292836 | A1* | 10/2016 | Perry | G06T 5/60 |
| 2019/0005016 | A1* | 1/2019 | Hamlin | G06F 40/166 |
| 2020/0066003 | A1* | 2/2020 | Baldwin | G06T 11/001 |
| 2021/0081093 | A1* | 3/2021 | Yun | H04N 5/232935 |
| 2022/0121723 | A1* | 4/2022 | Page | G06F 11/0784 |
| 2022/0241001 | A1* | 8/2022 | Wang | A61B 18/1492 |
| 2022/0342367 | A1* | 10/2022 | Seder | G03H 1/2294 |

OTHER PUBLICATIONS

Written Opinion of the International Searching Authority, dated Jul. 27, 2022, from corresponding International Application No. PCT/US2021/072702.

QAFOX, "AXE—Web Accessibility Testing Took (Very Useful Tool)", Jan. 20, 2021.

* cited by examiner

SYSTEMS AND METHODS OF DETERMINING CONTRAST FOR ACCESSIBILITY

BACKGROUND

1. Field of the Invention

Embodiments disclosed herein are generally directed to systems and methods for determining color contrast presented on a device to enhance user accessibility.

2. Description of the Related Art

Despite the widespread adoption and rapid growth of digital technology throughout the world, challenges have been faced in making digital interfaces accessible to all. This is particularly true with regard to designing and building user interfaces that are accessible to impaired individuals (e.g., visually impaired persons). Worldwide standards for digital interfaces have been published. These standards include best practices for digital interface accessibility. Cost of compliance with such standards, however, has limited adoption of the standards.

SUMMARY

In some aspects, the techniques described herein relate to a method of determining a contrast of colors displayed by a digital user interface, including: receiving, at a compliance module executing on an electronic device, a user selection of a graphical element displayed on a user interface of the electronic device; determining first color data associated with a background of the selected graphical element; determining second color data associated with a text string within the selected graphical element; determining a luminosity associated with the first color data and a luminosity associated with the second color data; determining that the luminosity associated with the first color data is greater than the luminosity associated with the second color data; calculating a contrast ratio of a color represented by the first color data to a color represented by the second color data based on a quotient of the luminosity associated with the first color data divided by the luminosity associated with the second color data; and displaying, at the user interface of the electronic device, the calculated contrast ratio.

In some aspects, the techniques described herein relate to a method, including: passing the first color data and the second color data to a method of the compliance module as parameters of the method of the compliance module.

In some aspects, the techniques described herein relate to a method, wherein the parameters of the method of the compliance module are defined as an integer primitive data type.

In some aspects, the techniques described herein relate to a method, wherein calculating the contrast ratio includes adding a contrast factor to the luminosity associated with the first color data and the luminosity associated with the second color data.

In some aspects, the techniques described herein relate to a method, including: calculating the contrast ratio as (L1+0.05)/(L2+0.05) where L1 is the luminosity associated with the first color data, L2 is the luminosity associated with the second color data, and 0.05 is the factor.

In some aspects, the techniques described herein relate to a method, wherein the ratio of the luminosity associated with the second color data to the luminosity associated with the first color data is displayed as a decimal number.

In some aspects, the techniques described herein relate to a method, wherein the luminosity associated with the first color data and the luminosity associated with the second color data are defined as a double primitive data type.

In some aspects, the techniques described herein relate to a method, including: determining a border around characters in the selected graphical element.

In some aspects, the techniques described herein relate to a method, including: determining an area of the border; determining that the area of the border is greater than a threshold area; and determining the first color data based on the border.

In some aspects, the techniques described herein relate to a method, including: determining an area of the border; determining that the area of the border is less than a threshold area; and determining the second color data based on the border.

In some aspects, the techniques described herein relate to an electronic device including a compliance module, wherein the compliance module is configured to: receive a user selection of a graphical element displayed on a user interface of the electronic device; determine first color data associated with a background of the selected graphical element; determine second color data associated with a text string within the selected graphical element; determine a luminosity associated with the first color data and a luminosity associated with the second color data; determine that the luminosity associated with the first color data is greater than the luminosity associated with the second color data; calculate a contrast ratio of a color represented by the first color data to a color represented by the second color data based on a quotient of the luminosity associated with the first color data divided by the luminosity associated with the second color data; and display, at the user interface of the electronic device, the calculated contrast ratio.

In some aspects, the techniques described herein relate to a non-transitory computer readable storage medium, including instructions stored thereon for determining a contrast of colors displayed by an interface of an electronic device, which when read and executed by a processor cause the processor to perform steps including: receiving, at a module of a compliance mode executing on the electronic device, a user selection of a graphical element displayed on a user interface of the electronic device; determining first color data associated with a background of the selected graphical element; determining second color data associated with a text string within the selected graphical element; determining a luminosity associated with the first color data and a luminosity associated with the second color data; determining that the luminosity associated with the first color data is greater than the luminosity associated with the second color data; calculating a contrast ratio of a color represented by the first color data to a color represented by the second color data based on a quotient of the luminosity associated with the first color data divided by the luminosity associated with the second color data; and displaying, at the user interface of the electronic device, the calculated contrast ratio.

In some aspects, the techniques described herein relate to a non-transitory computer readable storage medium, including: passing the first color data and the second color data to a method of the compliance module as parameters of the method of the compliance module.

In some aspects, the techniques described herein relate to a non-transitory computer readable storage medium, wherein the parameters of the method of the compliance module are defined as an integer primitive data type.

In some aspects, the techniques described herein relate to a non-transitory computer readable storage medium, wherein calculating the contrast ratio includes adding a contrast factor to the luminosity associated with the first color data and the luminosity associated with the second color data.

In some aspects, the techniques described herein relate to a non-transitory computer readable storage medium, including: calculating the contrast ratio as (L1+0.05)/(L2+0.05) where L1 is the luminosity associated with the first color data, L2 is the luminosity associated with the second color data, and 0.05 is the factor.

In some aspects, the techniques described herein relate to a non-transitory computer readable storage medium, wherein the ratio of the luminosity associated with the second color data to the luminosity associated with the first color data is displayed as a decimal number.

In some aspects, the techniques described herein relate to a non-transitory computer readable storage medium, wherein the luminosity associated with the first color data and the luminosity associated with the second color data are defined as a double primitive data type.

In some aspects, the techniques described herein relate to a non-transitory computer readable storage medium, including: determining a border around characters in the selected graphical element; determining an area of the border; determining that the area of the border is greater than a threshold area; and determining the first color data based on the border.

In some aspects, the techniques described herein relate to a non-transitory computer readable storage medium, including: determining a border around characters in the selected graphical element; determining an area of the border; determining that the area of the border is less than a threshold area; and determining the second color data based on the border.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for efficiently determining contrast on a digital interface are disclosed.

The emphasis from different organizations, including businesses, governments, advocacy groups, etc., on digital interface accessibility prompted the creation of standards directed to digital interface accessibility. One such organization is the World Wide Web Consortium (W3C). W3C has published Web Content Accessibility Guidelines (WCAG). The WCAG has become a de facto standard for digital content accessibility. An example of accessibility standards set forth in, e.g., WCAG v. 2.0, include a minimum contrast ratio of 4.5:1 (text to background) for the visual presentation of text and images of text that are smaller than a certain size.

A barrier to widespread adoption of digital interface accessibility standards is the inability to efficiently understand when a user interface is in compliance with the standards. Conventional approaches to determining a contrast ratio of a text color to a background color over which the text is displayed require a high level of manual involvement from developers.

Figure 1:
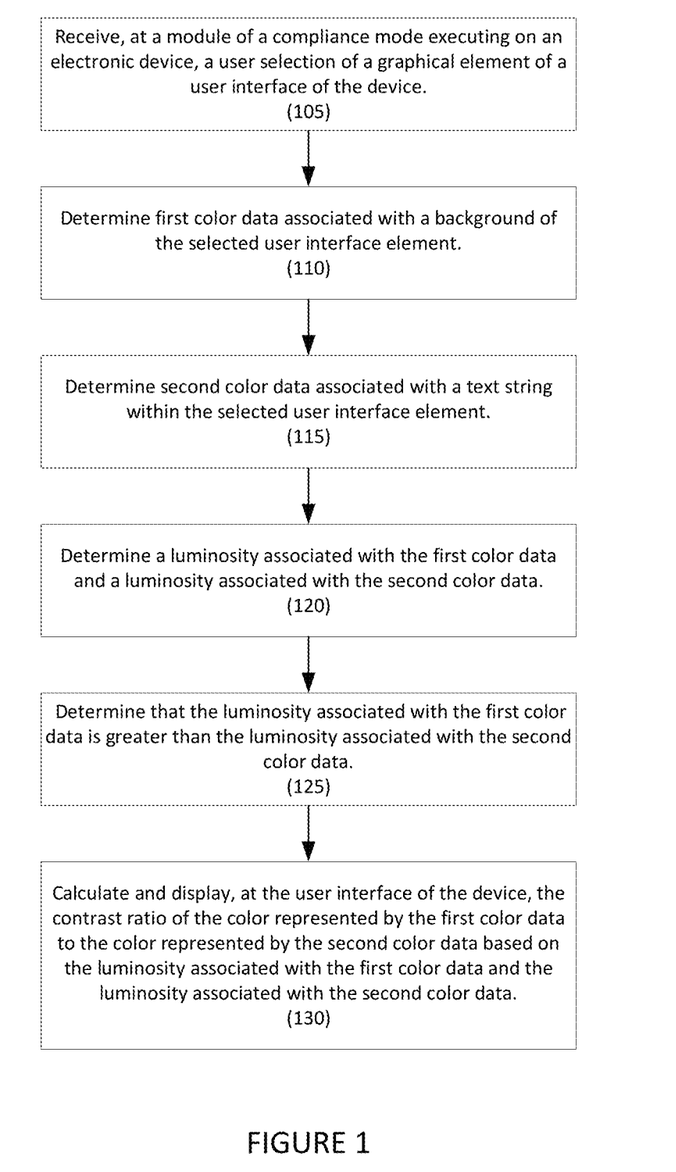
FIG. 1 discloses a method for determining and displaying a contrast ratio in accordance with embodiments.

In accordance with an embodiment, FIG. 1 discloses programmatic logic, or a method, for efficient inspections of a contrast ratio of an element of a graphical user interface. At step 105, a compliance module may include instructions for executing a compliance mode on an electronic device, and may receive a user selection of a graphical element displayed on a user interface of an electronic device. The user interface may be that of any electronic device. For example, the user interface may be a computer/laptop monitor, a mobile device screen, a point of sale system (POS) screen/monitor, etc. The module of the compliance mode may be a programmatic module, e.g., a software package, class, program, etc., that includes instructions for initiating a compliance mode that executes on the electronic device, and for receiving and processing defined user inputs while the compliance mode is initiated.

The graphical element may be, e.g., a component of an operating system ("OS") or an application that is displayed as part of a graphical user interface (GUI) on a display of the device. Examples of OS components or applications that may include graphical user interfaces include an internet browser application, a mobile device application, or any other application configured with a GUI and that displays graphical elements (e.g., graphical organizational components, graphical components tied to event listeners, etc.) on a user interface of an electronic device.

A user may interact with the user interface of the electronic device directly (e.g., a touch screen of a mobile device) or through intermediary interfaces (e.g., a mouse, keyboard, stylus, etc., of a desktop computer or other device).

At step 110 of FIG. 1, first color data associated with a background color of the selected graphical element may be determined. For instance, the compliance module may inspect the properties of the selected graphical element, one of which may be color data that digitally represents a displayed background color of the graphical element. Examples of digital representations of a displayed color incudes the hexadecimal value #ff0000 representing the color red, and the decimal code (255, 0,0) of the color red's RGB (red, green, blue) value, etc. The RGB decimal code for red may also be written as (255/255, 0/255, 0/255), or (1.0, 0.0, 0.0).

The selected graphical element may be programmatically defined within the application that generates it with properties including size, shape, background color, text color, actions, listeners, etc. When displayed via the device interface, graphical elements may represent, e.g., buttons, borders, backgrounds, html "divs" and other html containers, table rows or columns, or any other graphical element of an application having a GUI component.

At step 115 of FIG. 1, second color data associated with a text string within the selected user interface element may be determined in the same, or a similar manner, as described above with regard to determining first color data associated with a background color. That is, the compliance module may inspect the properties of the selected graphical element, one of which may be color data that digitally represents a color of text displayed by the graphical element.

In accordance with embodiments, background color may be defined as the specified color of an element over which text strings or characters are rendered in normal usage. An error condition may be specified if no background color is determined when a corresponding text color is determined. Such a condition may result if a default background color is unknown and/or cannot be evaluated for sufficient contrast. Similarly, an error condition may be specified if no text color is determined when a corresponding background color is determined.

In accordance with embodiments, if it is determined that there is a border around text strings or characters in the selected graphical element (e.g., if the compliance module determines a "text border" property defined by the graphical element), it may be further determined that the border has a higher (or lower) contrast than the text string or characters, and that, as a result, the border may add contrast with respect to the determined background color. In such scenarios, the determined text/character border color may be used in calculating the contrast between the text/characters and the background.

In other embodiments, a relatively narrow border around the text/characters may be determined by the compliance module as the text/characters, while a relatively wider border around the text/characters, especially a border that is "behind" or "underneath" the text/characters (i.e. one that "fills" the inner details of the text/characters) may be considered as a background. Thresholds, such as a computed total area of a border, or an amount of space (e.g., an amount of pixels) from one or several sides of the displayed text, may be incorporated into the compliance module when determining whether a border around displayed text will be treated as foreground text, or as a background to displayed text.

With continued reference to FIG. 1, at step 120, a luminosity associated with the first color data associated with a background color and a luminosity associated with the second color data associated with a text string may be determined. A luminosity value may be calculated from an RGB color value. An exemplary calculation may determine the decimal value of each of the red, green and blue components of a RGB color code, determine the largest value of these values, determine the smallest value of these values, and subtract the smallest of the values from the largest of the values. The resulting difference may represent the luminosity of the color represented by the RGB color code. For instance, given the RGB color code "RGB (0.83, 0.13, 0.18)" a luminosity for this color code may be 0.70 (0.83−0.13=0.70).

At step 125 of FIG. 1, it may be determined that the luminosity associated with the first color data is greater than the luminosity associated with the second color data. In accordance with embodiments, a luminosity associated with the first color data and the second color data may be represented by an integer, float, double, etc., data type, where a higher value equates to a higher relative luminosity associated with the corresponding color. The compliance module may compare the relative luminosities associated with the first color data and the second color data and determine the greater relative luminosity. For instance, it may be determined that the relative luminosity associated with the first color data is greater than the relative luminosity associated with the second color data, indicating that the color represented by the first color data has a greater luminosity as displayed on a user interface of an electronic device.

In other embodiments (not captured in FIG. 1), the compliance module may compare the relative luminosities associated with the first color data and the second color data and determine that the luminosity associated with the second color data is greater than the relative luminosity associated with the first color data, indicating that the color represented by the second color data has a greater luminosity as displayed on a user interface of an electronic device.

At step 130 of FIG. 1, a contrast ratio of the color represented by the first color data to the color represented by the second color data may be calculated and displayed at the user interface, i.e., to the user (e.g., a software developer). The calculated contrast ratio may be based on the determined relative luminosity associated with the first color data and the determined luminosity associated with the second color data.

In accordance with an embodiment, the calculated contrast ratio may be calculated as "A/B" where, as between the first and second color data, A represents the relative luminosity of the color data (either first or second color data) determined to be relatively greater, (e.g., in step 125), and B represents the relative luminosity of the color data (either first or second color data) determined to be relatively lesser. A contrast factor may be added to the determined relative luminosities in the calculation. For example, a contrast factor of 0.05 may be added to the relative luminosities.

In accordance with embodiments, the formula (L1+0.05)/(L2+0.05) may be used to calculate a contrast ratio, where L1 is the relative luminosity of the color data (either first or second color data) determined to be relatively greater, and L2 is the relative luminosity of the color data (either first or second color data) determined to be relatively lesser. That is, L1 is the determined relative luminosity of the lighter of the colors being compared, and L2 is the relative luminosity of the darker of the colors being compared.

The calculated contrast ratio may be displayed to a user as a ratio in the form of A:B, or as a decimal number. For example, a calculated ratio of nine to one may be display as 9:1, 9/1, or simply as 9.0 (or in any other desirable way that effectively conveys the calculated contrast ratio).

In accordance with embodiments, a popup graphical element including the calculated contrast ratio may be rendered by the compliance module at the user interface. The popup graphical element may include other information such as a textual description of the respective colors associated with the first and second color data (e.g., "red," "blue," "white," etc.). It may include the respective color data (e.g., the hexadecimal value #ff0000 representing the color red). It may further include a sample of the selected text and an indication of whether the calculated contrast ration meets a given standard in terms of being high enough (i.e., whether the contrast ratio "passes" under, e.g., the WCAG).

In embodiments, if the background is a solid color (or all black or all white) then the contrast ratio of the text may be maintained by assuring that text displayed over the background is configured to display in a color that maintains a threshold contrast ratio. For instance, a contrast ratio threshold for a range of text size may be a 7:1 contrast ratio with the background. The contrast ratio threshold may be based on accepted standards such as the WCAG.

If the background or the letters vary in relative luminance (or are patterned), then the background around the letters may be chosen or shaded so that the threshold contrast ratio is maintained. For instance, a 7:1 contrast ratio with the background behind such text may be maintained even if the text does not have that contrast ratio with the entire background. In embodiments, the contrast ratio may also be maintained by changing the relative luminance of the letters as the relative luminance of the background changes across the page.

Figure 2A:
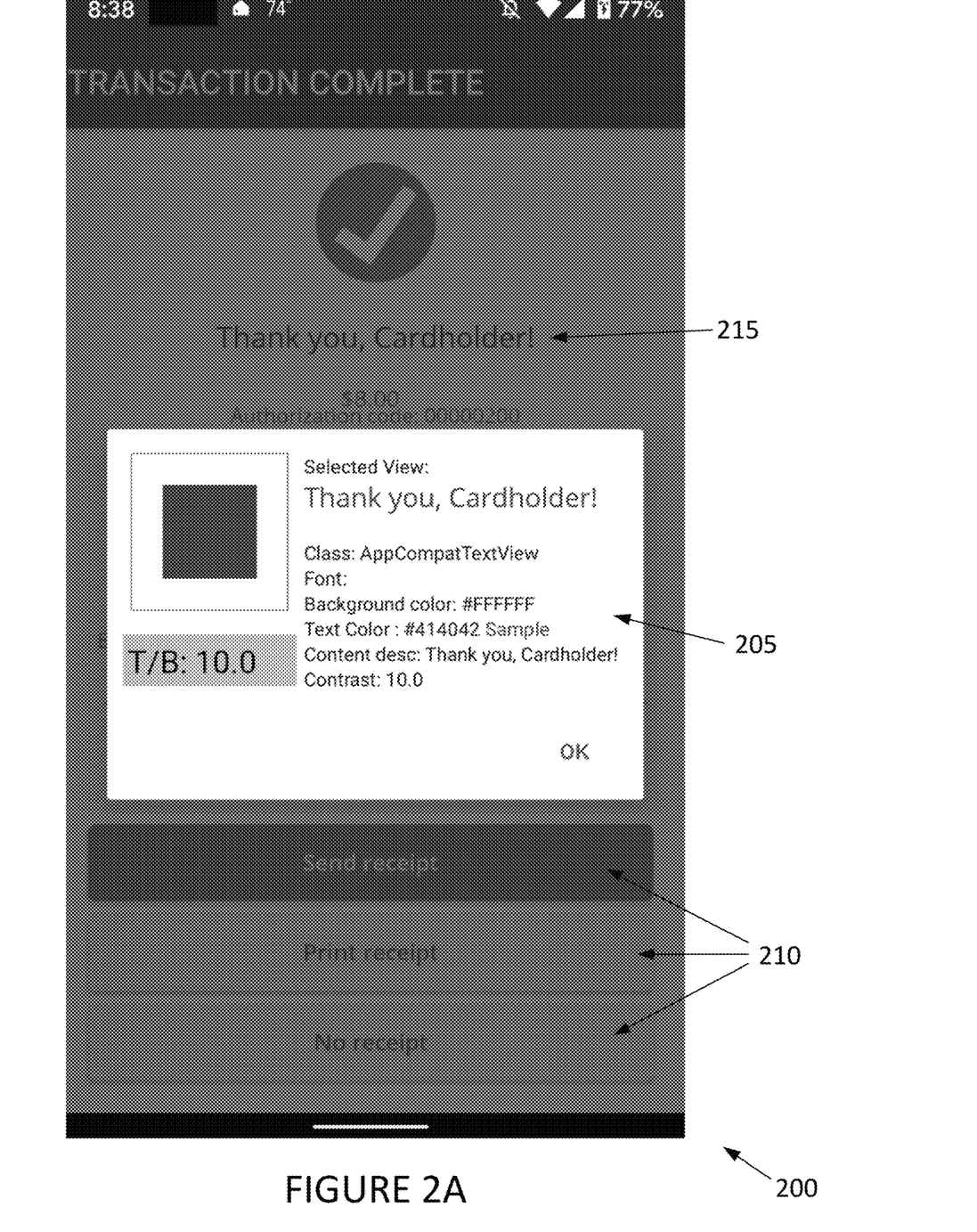
FIG. 2A is a diagram of a device and user interface in accordance with embodiments.

With reference to FIG. 2A, depicted is an electronic device 200 executing a compliance module, in accordance with embodiments. The compliance module (not shown) may be part of, and/or included with, an operating system configured to operate the electronic device 200. In other embodiments, the compliance module may be part of, and/or included with an application designed to execute on the electronic device 200.

In accordance with embodiments, electronic device 200 may be configured to execute an application, such as a POS application, a web browsing application, a word processing application, a mobile device application, or any other application configured to execute on device 200. The application may provide a graphical user interface with different graphical elements that a user may interact with.

Device 200 is depicted executing an application with different graphical elements. For instance, graphical elements 210 of the application are commonly referred to as "buttons." Depicted is a "Send Receipt" button, a "Print Receipt," and a "No Receipt" button. Graphical elements may have a background color and a text color.

The application executing on device 200 may also be configured to display a text view graphical element, such as text view graphical element 215 text view graphical element 215 also includes a background and foreground text. The background of text view graphical element 215 is white, and the foreground text is a light gray.

The application executing on device 200 includes a compliance module (not shown) as described herein. The compliance module is active (e.g., has been activated by a user) on device 200 and has generated popup graphical element 205 to display compliance information to the user of the application (e.g., a developer of the application). Popup graphical element 205 may be displayed when the user activates the compliance module. The compliance module may be activated in any suitable way. Exemplary ways of activating the compliance include turning the compliance module on in a settings menu of the application, or specific user input, such as a double-tap, right mouse click, etc., on a graphical element on the GUI of the executing application, such as button graphical elements 210 or text view graphical element 215. In accordance with embodiments, the compliance module may act as a background service an OS or an application, and be listening for user input whenever an OS or application that includes the compliance module is executing.

In accordance with embodiments, the compliance module may include a programmatic listener that maybe configured with a process that receives incoming information and/or data upon execution of a predefined event (e.g., a predefined user input event). The listener may manage data and traffic associated with these events. For example, the listener may receive and manage an action event such as a predefined user input event. The listener may receive, as a parameter of a method (e.g., a method of the compliance module) that executes upon the occurrence of specified event (e.g., a double tap of a graphical element), information or data, and may carry out additional methods to perform additional tasks upon receipt of the parameter data passed by the listener method.

With continued reference to FIG. 2A, the compliance module has generated popup graphical element 205 as a result of a user's interaction with the application while the compliance mode is active. In accordance with the embodiment depicted in FIG. 2A, popup graphical element 205 is depicted displaying properties of text view graphical element 215. That is, a user has initiated the generation of popup graphical element 205 by executing a predetermined user input while the compliance module is active.

For example, the compliance module may programmatically define a "double tap" on a graphical component as the predetermined input. The activated compliance module may be listening for the predetermined input. The compliance mode may receive the input as carried out by the user including information indicating the graphical element on which the input was carried out.

With continued reference to FIG. 2A, the user has carried out the predetermined input (e.g., the double tap) on text view graphical element 215, and the compliance mode has received the input and the information indicating that the input was carried out on text view graphical element 215. This, in turn, triggers the compliance module to determine the properties of text view graphical element 215, generate popup graphical element 205, and display the determined properties of text view graphical element 215 in popup graphical element 205 for easy and efficient observation by the user.

Popup graphical element 205 may include compliance information or other information determined from the properties of a selected graphical element of the application executing on device 200. For example, popup graphical element 205 includes a visual depiction of the background color (white) behind the foreground text color (dark gray) of text view graphical element 215 in the upper-left corner of popup graphical element 205. Popup graphical element 205 also includes a sample of the foreground text of text view graphical element 215. The sample reads "Thank you, Cardholder," as it also reads in text view graphical element 215.

Popup graphical element 205 additionally includes a font field that may display one or more styles of fonts of foreground text within the selected graphical element. Popup graphical element 205 includes a background color field displaying the hexadecimal color code of the background color of the selected graphical element (i.e., #FFFFFF). Popup graphical element 205 includes a foreground text color field displaying the hexadecimal color code of the foreground text color of the selected graphical element (i.e., #414042). Popup graphical element 205 further includes a content description and a contrast ratio, which, for the noted colors of the selected graphical element is calculated to be 10.0.

In accordance with embodiments, the calculated contrast ratio may be displayed in a background indicative of whether the contrast ratio meets or exceeds a particular standard or threshold. For instance, if the calculated ratio meets or exceeds an applicable standard or threshold, the ratio may be displayed on a green background, where the green background indicates compliance with the applicable standard or threshold. Alternatively, the calculated ratio may be displayed in a red background where the red background indicates non-compliance with the applicable standard or threshold. For example, if the threshold level for a complying contrast ratio is defined as 7.0, then the calculated contrast ratio of 10.0 would be determined as a passing ratio, and popup graphical element 205, may display the calculated ratio over a green background to signal to the user that the ratio in incompliance with the threshold ratio.

Figure 2B:
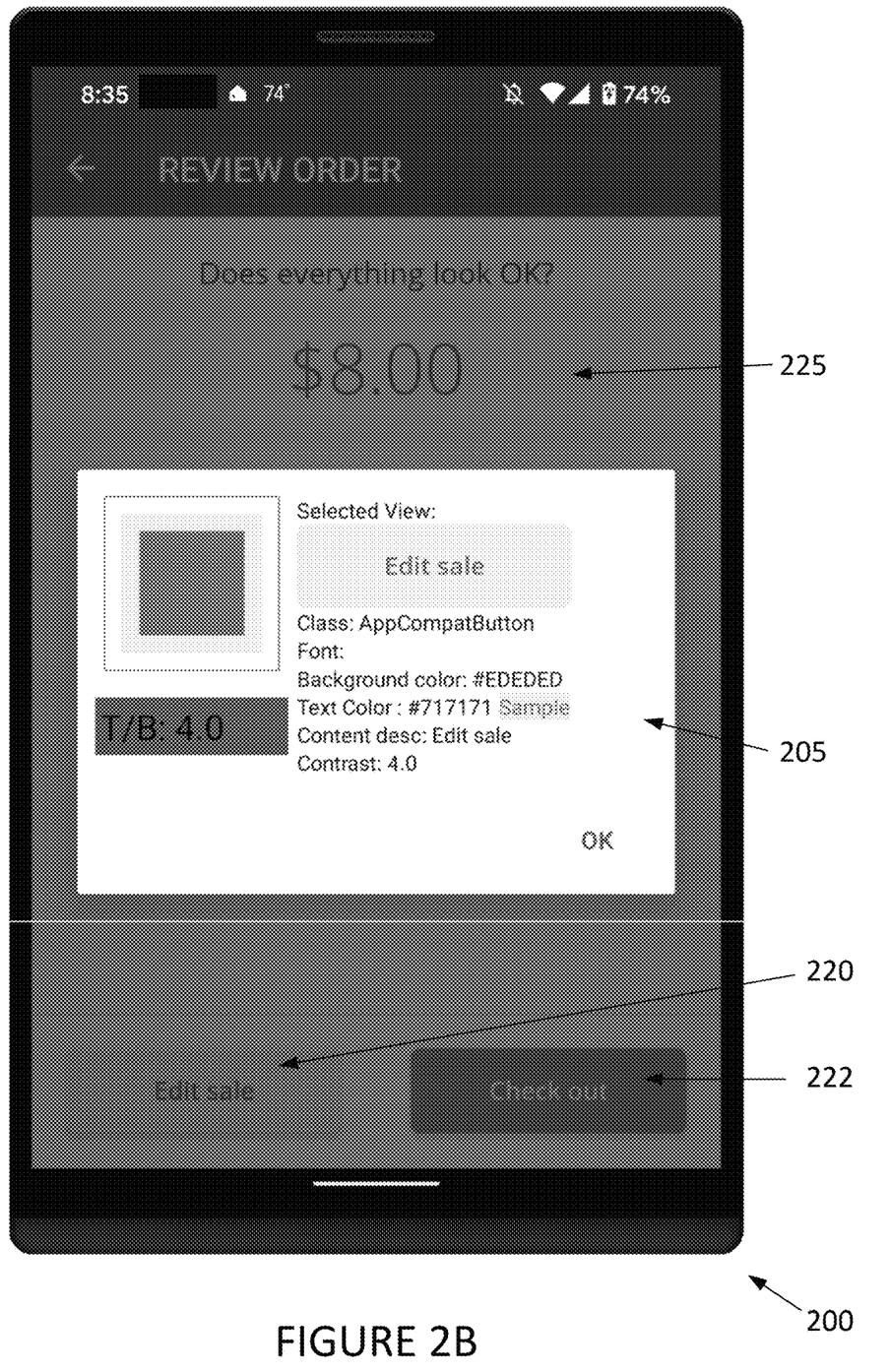
FIG. 2B is a diagram of a device and user interface in accordance with embodiments.

FIG. 2B depicts electronic device 200 executing a compliance module, in accordance with embodiments. FIG. 2B depicts alternative graphical elements 220, 222 and 225 that have been generated by the application executing on device 200. The alternative graphical elements include Edit sale button graphical element 220, Checkout button graphical element 222, and text view graphical element 225.

In the embodiment depicted in FIG. 2B, the compliance module is active and the user has carried out the predetermined input on Edit sale button graphical element 220. As a result, popup graphical element 205 has been generated and displays determined properties of Edit sale button graphical element 220.

With continued reference to FIG. 2B, Popup graphical element 205 displays a visual depiction of the background color (a light gray) behind the foreground text color (a darker gray) in the upper-left corner of popup graphical element 205. Popup graphical element 205 also includes a sample of the foreground text of the selected graphical element in the "selected view" field. The sample reads "Edit Sale" (as the actual button reads). Popup graphical element 205 includes a font field that may display one or more styles of fonts of foreground text within the selected graphical element (this field is displayed empty in popup graphical element 205 of FIG. 2B). Popup graphical element 205 includes a background color field displaying the hexadecimal color code of the background color of the selected graphical element (i.e., #EDEDED). Popup graphical element 205 includes a foreground text color field displaying the hexadecimal color code of the foreground text color of the selected graphical element (i.e., #717171). Popup graphical element 205 further includes a content description and a contrast ratio, which, for the noted colors of the selected graphical element is calculated to be 4.0.

The various processing blocks and/or data flows depicted in the figures are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method and flows as illustrated (and described in greater detail herein) are meant be exemplary and, as such, should not be viewed as limiting. The methods and flows herein may be implemented in the form of executable instructions stored on a machine-readable storage medium, and/or in the form of electronic circuitry.

Although multiple embodiments have been disclosed, it should be recognized that these embodiments are not mutually exclusive and features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as an FPGA, PLD, PLA or PAL, or any other device or arrangement of devices that are capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler, or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, dBase, Forth, Html, Java, Modula-2, Pascal, Prolog, Python, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

The invention claimed is:

1. A method of determining a contrast of colors displayed by a digital user interface, comprising:
   providing an application that executes on an electronic device, wherein the application includes a compliance module, and wherein the compliance module includes an active mode and an inactive mode, and wherein the active mode generates a popup graphical element in response to a predetermined user input with respect to a selected graphical element of the application;
   activating the compliance module into the active mode in response to a user input;
   receiving the predetermined user input on the selected graphical element of the application;
   determining, by the compliance module, based on the active mode and receipt of the predetermined user input:
      first color data associated with a background of the selected graphical element of the application;
      second color data associated with a text string within the selected graphical element;
      a luminosity associated with the first color data and a luminosity associated with the second color data; and
      that the luminosity associated with the first color data is greater than the luminosity associated with the second color data;
   calculating, by the compliance module, a contrast ratio of a color represented by the first color data to a color represented by the second color data based on a quotient of the luminosity associated with the first color data divided by the luminosity associated with the second color data; and
   displaying, at the digital user interface of the electronic device and via the popup graphical element, the calculated contrast ratio.

2. The method of claim 1, comprising:
   passing the first color data and the second color data to a method of the compliance module as parameters of the method of the compliance module.

3. The method of claim 2, wherein the parameters of the method of the compliance module are defined as an integer primitive data type.

4. The method of claim 1, wherein calculating the contrast ratio includes adding a contrast factor to the luminosity associated with the first color data and the luminosity associated with the second color data.

5. The method of claim 4, comprising:
   calculating the contrast ratio as $$(L1+0.05)/(L2+0.05)$$

where L1 is the luminosity associated with the first color data, L2 is the luminosity associated with the second color data, and 0.05 is the factor.

6. The method of claim 1, wherein the ratio of the luminosity associated with the second color data to the luminosity associated with the first color data is displayed as a decimal number.

7. The method of claim 1, wherein the luminosity associated with the first color data and the luminosity associated with the second color data are defined as a double primitive data type.

8. The method of claim 1, comprising:
   determining a border around characters in the selected graphical element.

9. The method of claim 8, comprising:
   determining an area of the border;
   determining that the area of the border is greater than a threshold area; and
   determining the first color data based on the border.

10. The method of claim 8, comprising:
    determining an area of the border;
    determining that the area of the border is less than a threshold area; and
    determining the second color data based on the border.

11. An electronic device for determining a contrast of colors displayed by a digital user interface, comprising:
    at least one memory storing program instructions executable by at least one processor; and
    the at least one processor coupled to the at least one memory and configured to:
    provide an application that executes on the electronic device, wherein the application includes a compliance module, wherein the compliance module includes an active mode and an inactive mode, and wherein the active mode generates a popup graphical element in response to a predetermined user input with respect to a selected graphical element of the application;
    activate the compliance module into the active mode in response to a user input;
    receive the predetermined user input on the selected graphical element of the application; and
    in response to the activation of the active mode, and receipt of the predetermined user input, the compliance module is configured to:
       determine first color data associated with a background of the selected graphical element of the application;
       determine second color data associated with a text string within the selected graphical element of the application;
       determine a luminosity associated with the first color data and a luminosity associated with the second color data;
       determine that the luminosity associated with the first color data is greater than the luminosity associated with the second color data;
       calculate a contrast ratio of a color represented by the first color data to a color represented by the second color data based on a quotient of the luminosity associated with the first color data divided by the luminosity associated with the second color data; and
       display, at the digital user interface of the electronic device and via the popup graphical element, the calculated contrast ratio.

12. A non-transitory computer readable storage medium, including instructions stored thereon for determining a contrast of colors displayed by a digital user interface of an electronic device, which when read and executed by a processor cause the processor to perform steps comprising:
    providing an application that executes on an electronic device, wherein the application includes a compliance module, and wherein the compliance module includes an active mode and an inactive mode, and wherein the active mode generates a popup graphical element in response to a predetermined user input with respect to a selected graphical element of the application;

activating the compliance module into the active mode in response to a user input;

receiving the predetermined user input on the selected graphical element of the application;

determining, by the compliance module, based on the active mode and receipt of the predetermined user input:

first color data associated with a background of the selected graphical element of the application;

second color data associated with a text string within the selected graphical element;

a luminosity associated with the first color data and a luminosity associated with the second color data; and that the luminosity associated with the first color data is greater than the luminosity associated with the second color data;

calculating, by the compliance module, a contrast ratio of a color represented by the first color data to a color represented by the second color data based on a quotient of the luminosity associated with the first color data divided by the luminosity associated with the second color data; and displaying, at the digital user interface of the electronic device and via the popup graphical element, the calculated contrast ratio.

13. The non-transitory computer readable storage medium of claim 12, comprising:

passing the first color data and the second color data to a method of the compliance module as parameters of the method of the compliance module.

14. The non-transitory computer readable storage medium of claim 13, wherein the parameters of the method of the compliance module are defined as an integer primitive data type.

15. The non-transitory computer readable storage medium of claim 12, wherein calculating the contrast ratio includes adding a contrast factor to the luminosity associated with the first color data and the luminosity associated with the second color data.

16. The non-transitory computer readable storage medium of claim 15, comprising:

calculating the contrast ratio as $$(L1+0.05)/(L2+0.05)$$

where L1 is the luminosity associated with the first color data, L2 is the luminosity associated with the second color data, and 0.05 is the factor.

17. The non-transitory computer readable storage medium of claim 12, wherein the ratio of the luminosity associated with the second color data to the luminosity associated with the first color data is displayed as a decimal number.

18. The non-transitory computer readable storage medium of claim 12, wherein the luminosity associated with the first color data and the luminosity associated with the second color data are defined as a double primitive data type.

19. The non-transitory computer readable storage medium of claim 12, comprising:

determining a border around characters in the selected graphical element;

determining an area of the border;

determining that the area of the border is greater than a threshold area; and determining the first color data based on the border.

20. The non-transitory computer readable storage medium of claim 12, comprising:

determining a border around characters in the selected graphical element;

determining an area of the border;

determining that the area of the border is less than a threshold area; and determining the second color data based on the border.

* * * * *